July 30, 1929. W. HARPER, JR 1,722,260
COMBUSTION ENGINE AND METHOD OF OPERATING SAME
Filed July 6, 1925 6 Sheets-Sheet 3
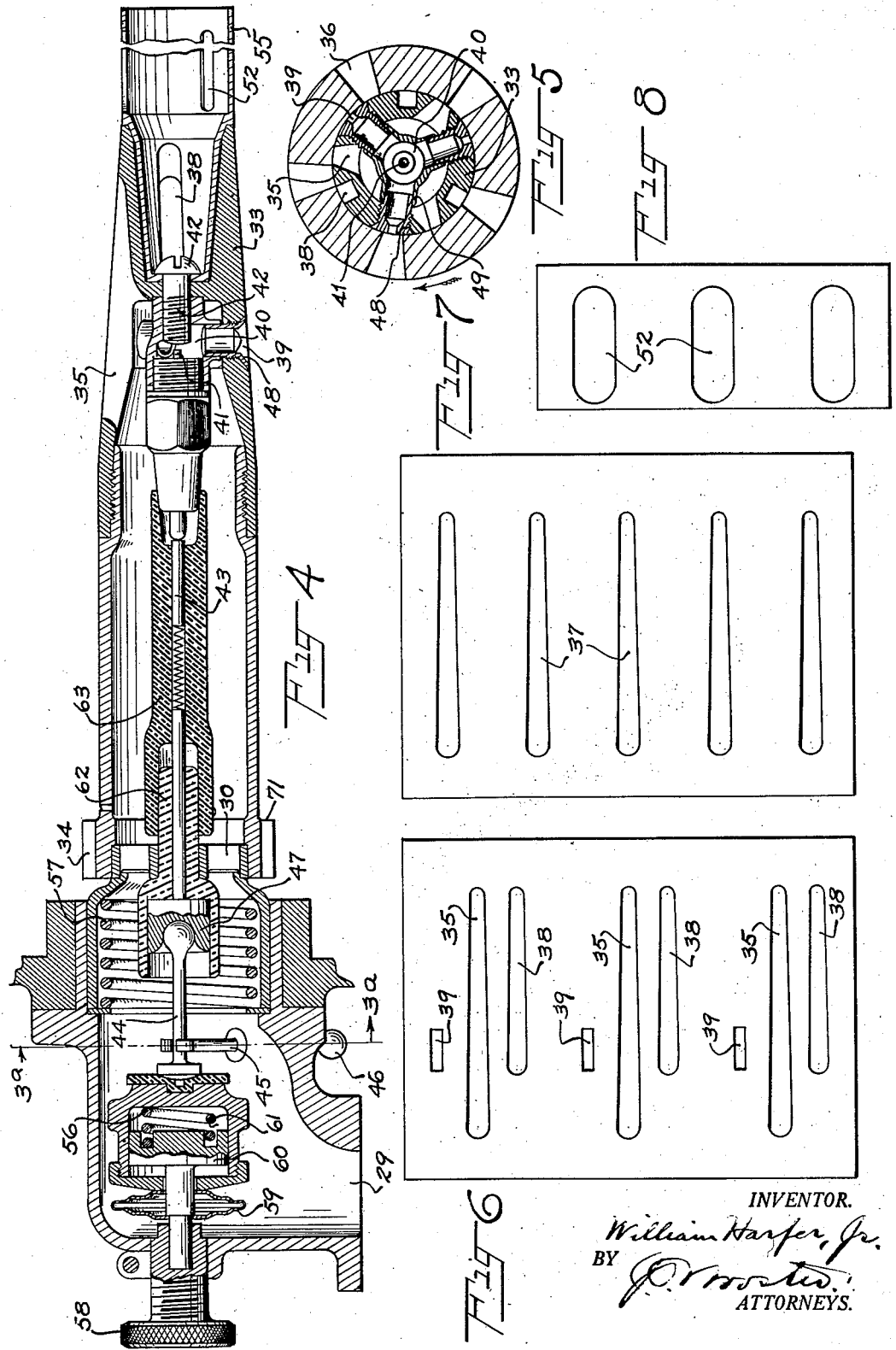

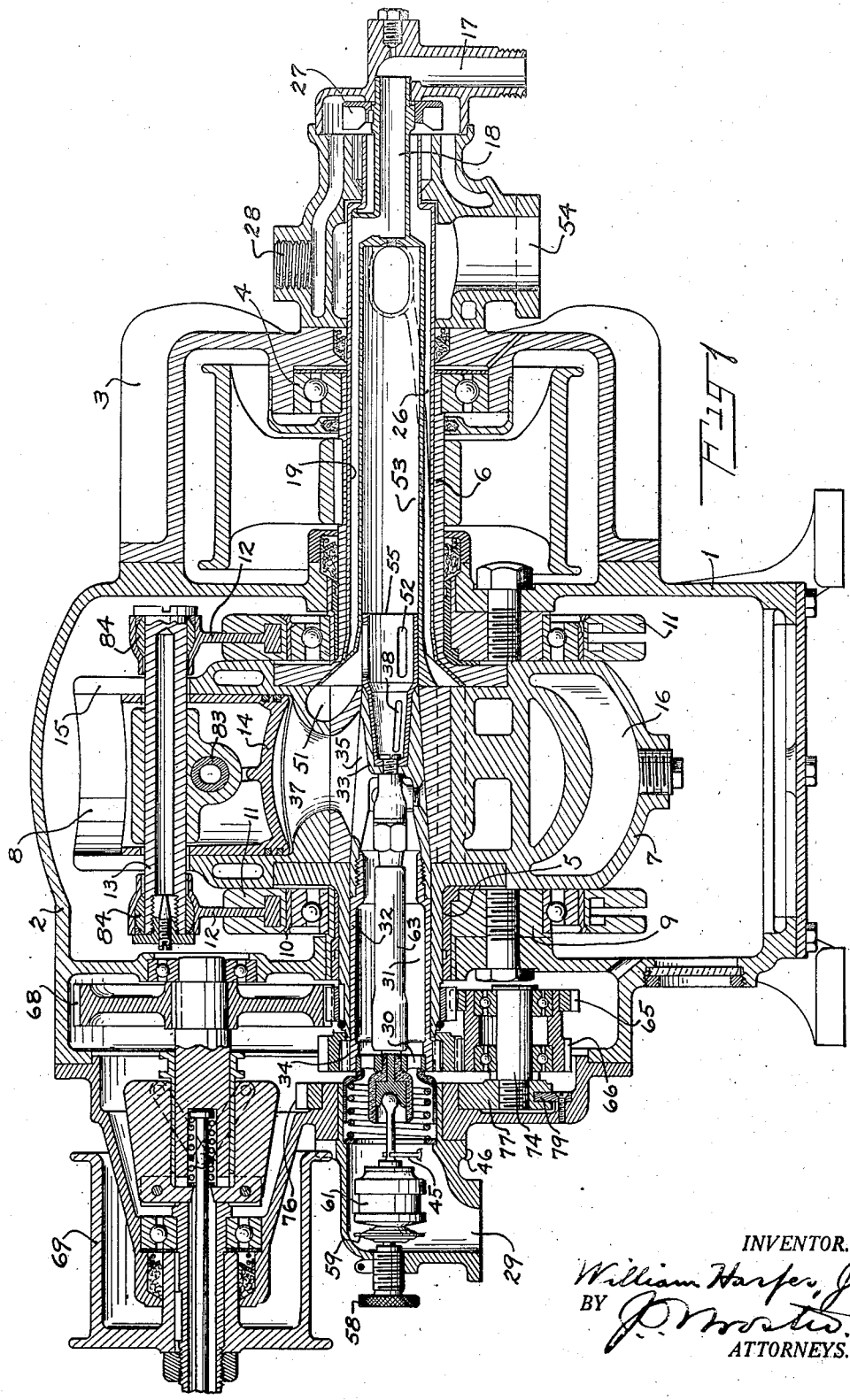

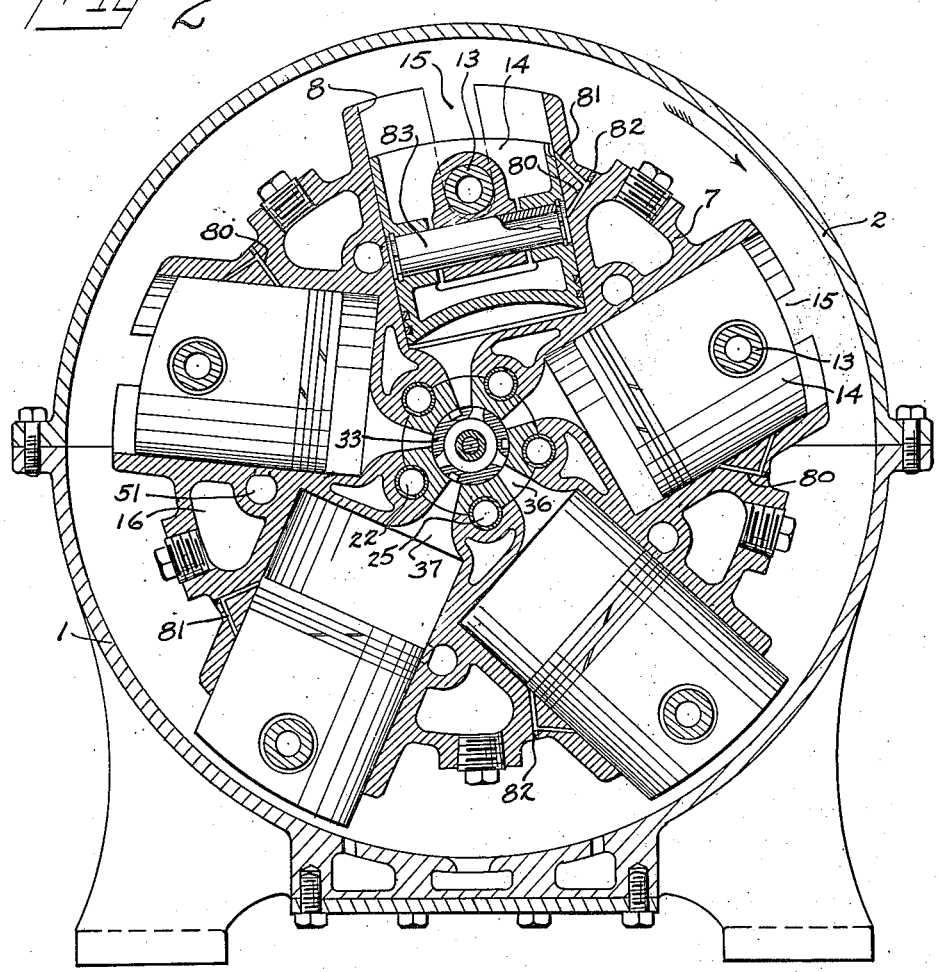
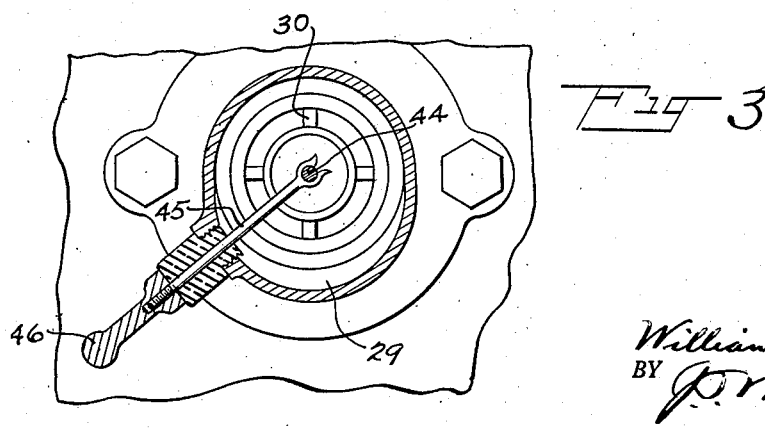

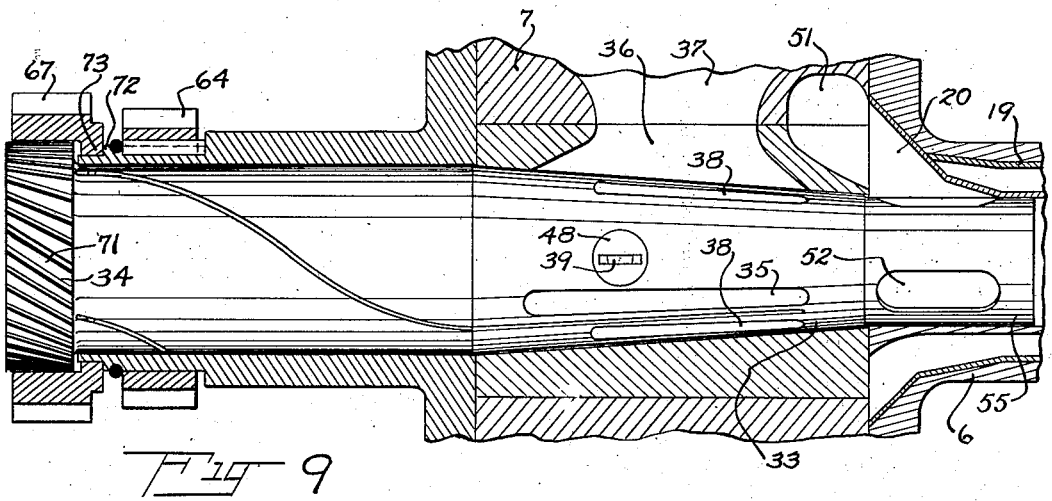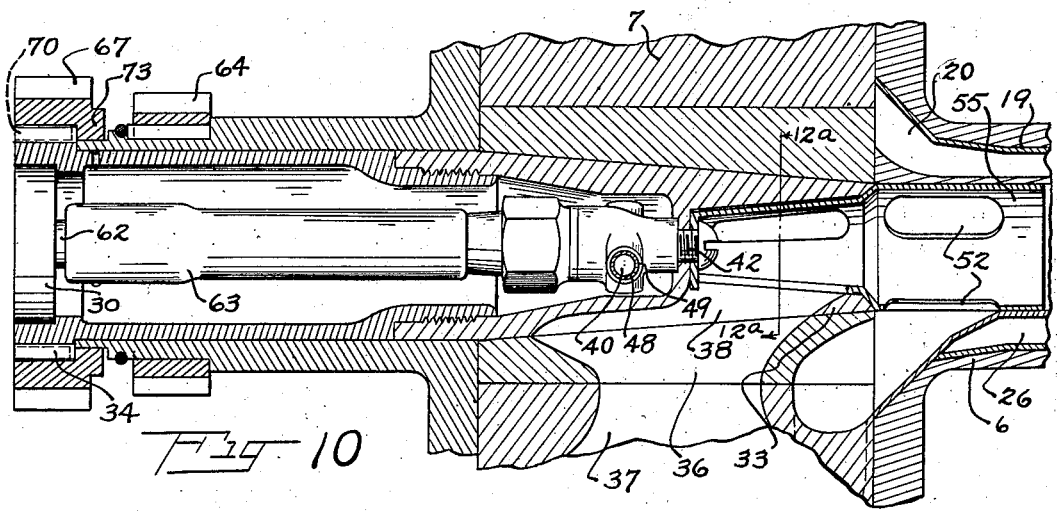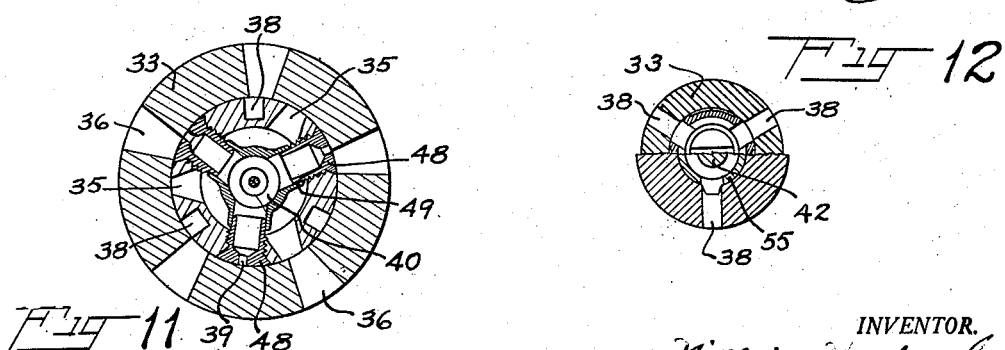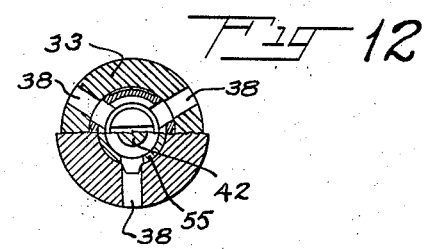

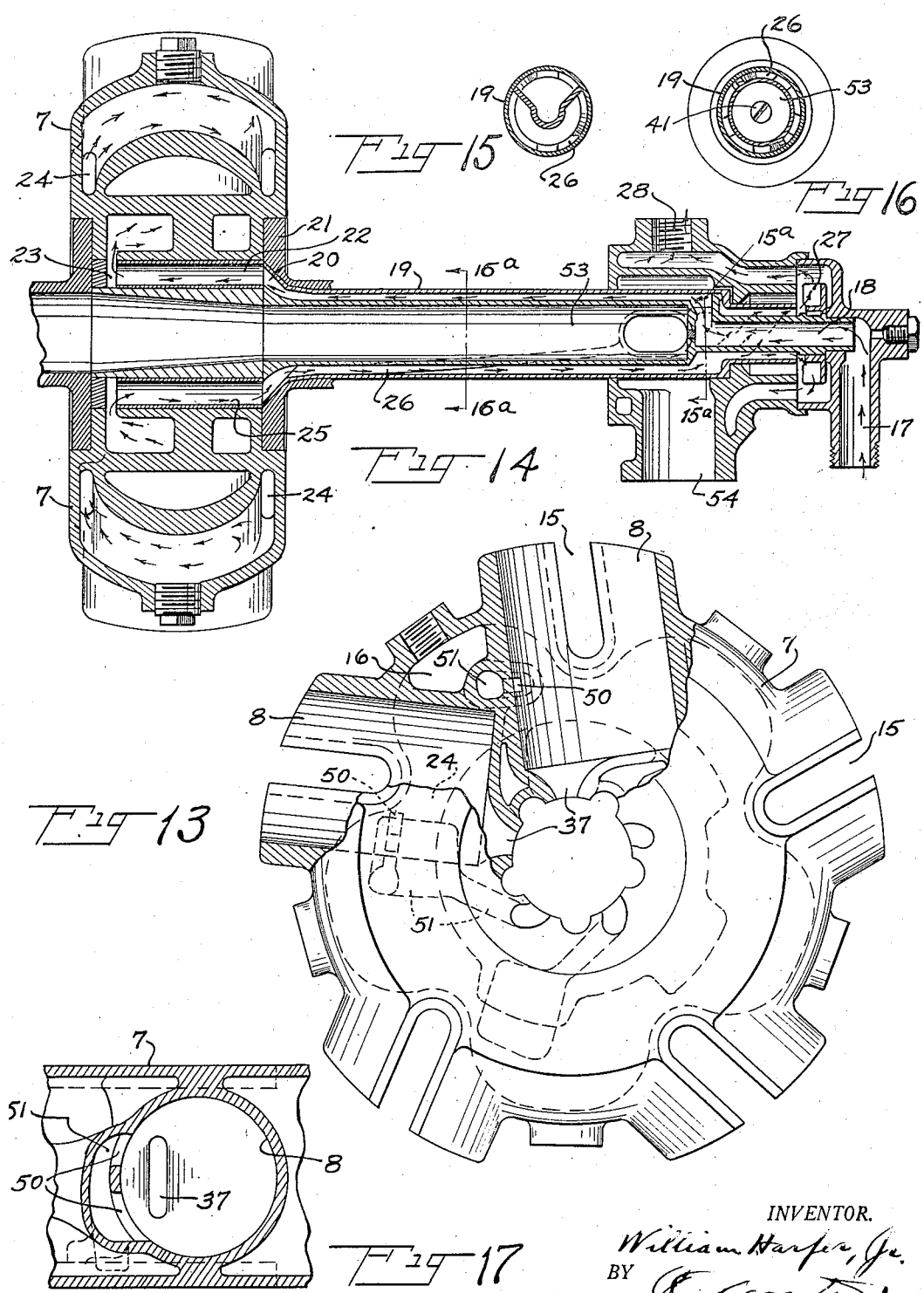

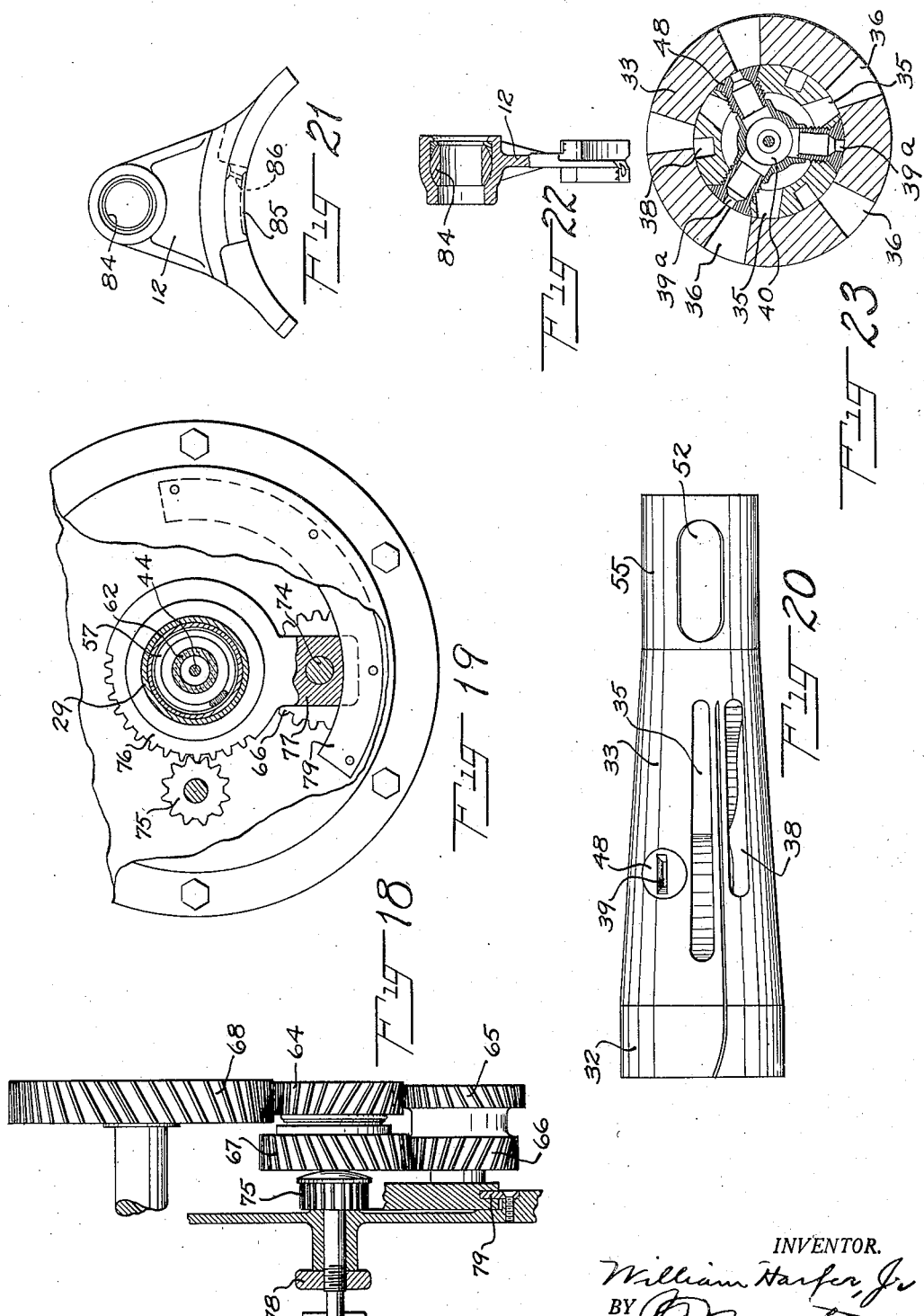

Patented July 30, 1929.

1,722,260

UNITED STATES PATENT OFFICE.

WILLIAM HARPER, JR., OF NEW BLOOMFIELD, PENNSYLVANIA, ASSIGNOR TO AMERICAN GAS TURBINE CORPORATION, OF NEW YORK, N. Y., A CORPORATION OF DELAWARE.

COMBUSTION ENGINE AND METHOD OF OPERATING SAME.

Application filed July 6, 1925. Serial No. 41,548.

This invention relates to internal combustion engines and has for its object to increase the efficiency thereof.

According to this invention internal regeneration supercharging in a multiple cylinder combustion engine with overlapping power impulses is accomplished by passing a portion of incandescent charge at high temperature and pressure from a working cylinder into a succeeding cylinder before completion of ignition in the latter to increase the mean effective pressure of the engine and thereby increase its efficiency. This is accomplished by extracting said portion of charge early enough in the power stroke to have it very hot and almost a maximum, and then passing the extracted portion by a small short, heat insulated passage into the succeeding cylinder whereby heat absorption in the walls of the passage is minimized and the heat energy transferred greater. The portion of charge is preferably disconnected from the working cylinder before being connected with the succeeding cylinder in order to preclude the possibility of any backflow of heat from the second cylinder into the first. After attaining the desired speed timing of the valve is changed to stop the cumulative effect and increase of speed from the internal supercharging.

The foregoing is performed in a rotary cylinder engine having a concentric valve controlling the supply of fuel charge, the heat transfer passage being located in said valve. The cylinders are preferably tangentially arranged in order that the portion of charge extracted early from a working cylinder may be added to a successively fired cylinder considerably before the end of its compression stroke and yet produce a desirable torque by reason of the inclination the desired speed timing of the valve is tapered and provided with means to unseat the same slightly on expansion and the heat transfer or internal supercharging passages so located with respect to the other valve passages that the taper of the valve is kept constant when the valve is hot or cold to obtain better operation at all times.

Other features contributing to the efficient operation include means for equalizing the load on the yokes transmitting the piston pressures, simple means for cushioning the longitudinal thrusts on the valve, better means for lubricating, and safety mechanism to prevent the valve unseating means from jamming the valve on its seat in case of rotation in a reverse direction.

In the accompanying drawings—

Fig. 1 is a longitudinal vertical cross-section of the engine;

Fig. 2 is a transverse vertical cross-section;

Fig. 3 is a section on the line 3ª—3ª of Fig. 4;

Fig. 4 is a longitudinal section through the valve, sleeve, and a cushioning means;

Fig. 5 is a cross-section through the shaft and valve showing the heat transfer or supercharging ports;

Fig. 6 is a development of the valve;

Fig. 7 is development of the shaft ports;

Fig. 8 is a development of the auxiliary exhaust ports;

Fig. 9 is a longitudinal view partly in section of the valve and its driving gears;

Fig. 10 is a view corresponding to Fig. 9 but with the valve shown partly in cross-section and its driving gear in a different position;

Fig. 11 is a section through the valve and heat transfer ports at the instant of passage of hot gases through the valve from a firing cylinder into a second cylinder;

Fig. 12 is a section on the line 12ª—12ª of Fig. 10;

Fig. 13 is a view of the rotor partly in section;

Fig. 14 is a longitudinal section showing the water cooling system;

Fig. 15 is a section on the line 15ª—15ª of Fig. 14;

Fig. 16 is a section on the line 16ª—16ª of Fig. 14;

Fig. 17 is a section across the top portion of the rotor and looking down into one of the cylinders;

Fig. 18 shows the driving gears for the valve;

Fig. 19 is an end view of the means for adjusting the timing of the valve;

Fig. 20 shows the valve;

Fig. 21 shows one of the yokes;

Fig. 22 is an end view partly in section of the yoke shown in Fig. 21;

Fig. 23 shows a modified form of valve.

This invention comprises a base casing 1, having a removable top 2, and removable end casing 3 provided therein with bearings 4, 5, a rotor 7 with shaft 6, having fixed thereto a rotor casting 7, cylinders 8 which are preferably tangential though they may be radial, cylinders and shaft rotating as a unit in the casing 1, 3. Mounted on a fixed portion of the casing by the ball bearing illustrated is an eccentric ring 10 having a T-shaped track 11 in which the yokes 12 carrying wrist pins 13 connected to pistons 14 are secured. The track 11 rotates with the rotor but being eccentrically mounted the yokes are free to slide in the track. The wrist pins 13 project through the sides of the cylinders and slide in the slots 15. Water jacket space 16 is cored in the rotor casting surrounding the cylinder, as shown in Figs. 1, 2, 13 and 14, and providing centrifugal water circulation as shown in Fig. 14, the water coming in through the pipe 17 passing through the passage 18 within the shaft extension 19 to the passage 20 in the detachable end plate 21, thence by key tubes 22, which key the rotor casting to the shaft 6, thence by the passage 23 in the cylinder into the water jacket space 24 around the cylinder, thence returning to the exhaust side of the cooling system through alternate key tubes 25, passage 26, pump 27, outlet 28 to a radiator or other cooler, and thence to the intake 17, providing a combined centrifugal and forced cooling circulation. As shown herein three of the key tubes 25 are exhaust tubes, and the remaining two key tubes 22 are inlet tubes, the volume of the exhaust water being slightly larger than that of the intake owing to expansion.

The charge inlet is by pipe 29 through the rotary mixing device 30 fixed to the valve sleeve 32. The fuel mixture then passes into the passage 31 within the valve sleeve 32 and into the tapered valve 33, through the supply ports 35 into the cylinders. The tapered valve carried by the sleeve 32 is driven by the valve driving gear 34, Figs. 1 and 4. The tapered valve 33 is provided with three inlet ports 35, three exhaust ports 38, and three internal regenerative supercharging ports 39 for the transfer of heat energy. Owing to the differential driving means for the valve, only three of each of such ports are necessary with the five-cylinder engine illustrated. In the five cylinder engine illustrated the valve rotates one-sixth slower than the cylinders. In a seven cylinder engine the valve rotates one-eighth slower. Each valve port is adapted to register with the shaft ports 36, which are accurately machined and secured to register with the cylinder ports 37, see Fig. 2.

The heat transfer or combustion chamber 40 formed between the ports 39 constitutes a heat reservoir, and is preferably provided with spark contacts for starting ignition, which comprise the contact 41 spaced a short distance from the grounded contact 42. The supply current for the spark is carried by the electrode 43, plunger 44 held within its socket 47 in contacting with rod 45 leading out of the terminal 46. To provide proper design of the heat transfer ports nipples 48 shown in Figs. 5, 11, and 23 are screwed into the tapered valve for carrying the heat transfer ports 39. The chamber 40 is connected with each of these ports through a small expansion joint 49. The passages between chamber 40 and ports 39 are smaller than the chamber and larger than the ports in cross sectional area.

The exhaust of this engine occurs in three stages, first the ignition exhaust for internal supercharging or transfer of heat from the working cylinder through the ports 39 and chamber 40 to the second succeeding or compressing cylinder; secondly, the main high temperature exhaust which is through the ports 50 shown in the cylinder walls in Figs. 13 and 17, into the passage 51, thence through the ports 52 in the tubular valve body 55, carried by the valve 33 and, lastly, the residual exhaust through cylinder head ports 37, shaft ports 36, exhaust ports 38 in the valve 33. The residual exhaust through the cylinder heads and the main exhaust through the ports 50 both pass out through the exhaust passage 53 in the shaft, and thence out the pipe 54 leading from the engine. The exhaust passages 51 are shown in Fig. 13 as being curved in direction so as to permit of water jacketing between them. The additional tubular valve 55 controlling the main exhaust is desirable to prevent back-firing in a 4-cycle engine because the ports 50 are opened and closed by the piston once in each revolution. This valve 55 prevents exhaust gas being drawn into the cylinder just before the completion of the suction stroke. This valve 55 like the main valve 33 requires only three ports 52 because the valve is differentially driven with main valve 33 in the 5-cylinder engine illustrated. The tubular valve 55 need not be as tight and close a fit as the main valve 33. Scavenging of the cylinders of low temperature exhaust gas is accomplished by the inward stroke of the piston through the cylinder ports 37, shaft ports 36 and exhaust ports 38 in the conical valve body 33.

The internal supercharge or regeneration is timed by manual means described later. With this engine it is possible to transfer a portion of the incandescent charge from a working cylinder to a succeeding cylinder before the second cylinder is at the completion of its compression stroke and it is possible to have this transfer occur as much as 80 circular degrees in advance of the innermost point of the piston travel. The reasons why this heat energy transfer and ignition may occur as early in the compression stroke without producing any knock in the cylinder is due to several things. The cylinders being preferably tangent to a circle whose radius is equal to one-half the piston stroke, and due to the fact that the pistons are moving slowly, there is no substantial leverage to cause any appreciable knock. A further reason is to be found in the thorough agitation of the compressed gases by the incoming stream of heated gases, and this occurs when the volume between cylinder head and piston is not a minimum but decreasing. In the working cylinder the heat transfer occurs anywhere from roughly one-third to a half and often two-thirds of the power stroke, though it may occur earlier or later in the power stroke provided the pressure in the successively fired cylinder be not greater than that of the hot gases transferred.

The conical valve body 33 is held seated by the springs 56 and 57 controlled by the thumb screw 58 but cushioning of thrusts on the valve due to unbalanced pressure is taken up largely by the diaphragm 59 connected with the hydraulic cylinder 61 and piston 60, illustrated in Fig. 4. Thrusts forcing the valve to the left in Figs. 1 and 4 are taken up by this diaphragm and cylinder. Either the piston may be loosely fitting to permit a slow passage of liquid past it or, as is the case here, small perforations not shown are provided in the piston. The insulating bushing 62 and insulated sleeve 63 protect the current going to the spark plug, and the bushing 62 also is arranged to transmit thrusts of the valve.

In Figs. 5 and 11 are shown the preferred form of valve having its ports 39 so proportioned with regard to the cylinder ports that the portion of a charge extracted is cut off from the working cylinder before connected to the successively fired cylinder. In Fig. 23 is shown a modified valve having its ports 39 slightly wider whereby the working and succeeding cylinders are connected but only for an instant and before any backflow of heat into the working cylinder can occur. In both forms of valve the heat reservoir or combustion chamber 40 is connected with some cylinder containing a freshly ignited charge almost continuously and a charge of incandescent gas is intermittently passed out of the reservoir into a succeeding cylinder. This reservoir 40 is disconnected from each working cylinder before completion of the working stroke, which prevents excessive temperature and pressure drop therein.

Differential driving of the valve is accomplished from the shaft driving gear 64 through connected gears 65 and 66 to outside gears 67; thence to the valve, through inside teeth 70 on a gear 67, and then to the teeth 71 on valve sleeve 32. Power is conveyed from the shaft through its gear 64 to the gear 68 connected with the driving pulley 69. For automatically unseating the valve 33 with increases in its driving torque the gears are of the skew type and to partially balance lateral thrusts in some of the transmission gears they are made with the skew teeth oppositely arranged.

As shown in Figs. 9 and 10 the driving shaft is provided with a shoulder 72 normally contacting with the flange 73 of the gear 67. In this position the gear 67 is ready to slightly unseat the valve 33 by moving it to the left on increase of driving torque. In case of the engine turning in the wrong direction and to prevent the skew gears from jamming the valve or its seat, the gear 67 is made slightly slidable so that after turning a portion of a revolution in the wrong direction it assumes the position shown in Fig. 10, when flange 73 is out of contact with shoulder 72, but engaging the gear 34 on the valve sleeve 32 to shift the valve and prevent its jamming in its seat.

To adjust the timing of the valve a lock nut 78 is released to enable rotation of the gear 75 engaging teeth 76 on the member having a projection 77 carrying the auxiliary shaft 74 on which are mounted the gears at 65 and 66. Shifting the position of the auxiliary shaft 74 will shift the angular relationship between the valve ports and the shaft ports or adjust the timing of the valve. Unlike other engines the timing of this valve is adjustable during rotation. The guide frame 79 fitting in a slot in the projection 77 holds said projection in line.

The engine is oiled by centrifugal force; the rotary motion given the supply charge fed in through the inner space 31 of the valve sleeve 32 by the mixing device 30 causes any liquid oil particles to be separated out and to fall into the bottom of the space 31. From there oil grooves lead the oil thus separated into helical grooves on the outside of the valve sleeve, as shown in Fig. 9 for example, these grooves are arranged to force the oil to the right toward the tapered portion of valve 33, where substantially straight longitudinal grooves keep the valve lubricated, as described in the previously referred to applications.

To remove excess oil from the cylinders into the casing and to lubricate the piston, liquid oil particles are centrifugally separated and pass into the oil passage 80 shown in Fig. 2 when this passage is uncovered by the piston. A plug 82 closes the end of passage 80 while communicating passage 81 leads into the casing and cylinder beyond the piston. The passage 82 leads from the leading side of the cylinder wall where centrifugal force is a maximum in enabling the oil to be separated. In order that the exhaust may be as dry as possible the exhaust port 50 leads from the lagging side of the tangentially arranged cylinder. The passages 80 and 81 leading into the cylinder are spaced far enough apart so that both of said passageways are not uncovered by the piston at the same time; as the piston moves outwardly oil collects in passages 80, and as the piston moves inwardly uncovering the mouth of 81 the oil then discharges from 80 and 81, spurts out into the casing under the influence of centrifugal force and provides the necessary piston lubrication.

In order to equalize the wear on the yokes 12 carried by the wrist pin 13 and prevent one yoke from carrying most of the load, means are provided for equalizing the pressure on each yoke. This is done by the provision of a pivotal wrist pin support 83, enabling the wrist pin 13 to oscillate about support 83 in order to equalize the pressure on the yokes. In the ends, the wrist pins are provided with a spherical bearing 84 shown in Figs. 21 and 22. To lubricate the feet of the yokes an oil hole 86 leads from the groove 85 on the under side of the yoke feet, to the upper side of said feet for oiling.

This engine embodies a number of distinctive characteristics among which may be mentioned the increase in thermal efficiency due to successful internal supercharging by the regenerative transfer of hot gases from a working cylinder into a successively fired cylinder. An essential of successful internal supercharging or heat energy transfer is that the path shall be a minimum in distance in order to keep from unduly cooling the hot gases, because the temperature of these heated gases is very high when occurring in the early part of the power stroke and considerably above the relatively low temperature of the exhaust. The passageways for the transfer of this heat energy have been so constructed as to absorb a minimum amount of heat. In fact so little heat is absorbed that the heat energy transfer is of an increasing quantity with each successively fired cylinder, resulting in acceleration in engine speed with increase in temperatures and means effective pressures up to the structural limitations and speeds for which the engine is designed, necessitating a possible adjustment of timing to keep from further increasing speed and pressures above safe limits. Instead of a change in timing to stop the acceleration, control of the throttle valve will serve the same purpose. Another characteristic of the heat energy transfer ports is their relatively narrow width and short length. By having the ports of short length the amount of wall space in contact with the hot gases is a minimum. Owing to the excessive temperatures encountered the heat energy transfer ports 39 and the chamber 40 are made preferably of chromel metal, a high chromium nickel alloy which is not affected by the heat, being nonoxidizing and of low coefficient of expansion. Another feature contributing to the absorption of a minimum amount of heat by the heat transfer passage and chamber is the arrangement of these parts as shown in Figs. 5 and 11 within the valve and spaced from the walls thereof so that there is little heat conduction from the chamber 40 to the valve walls. Also the chamber 40 is surrounded by a space through which the incoming fuel charge is passed with the result that the temperature of the chamber 40 is kept within safe limits while at the same time heating the supply gases. The gas chamber 40 is heated substantially continuously by connection with working cylinders in the early portions of their working stroke.

With this invention the valve may be cooler and the heat energy transfer passage hotter than in any previous construction, the temperature of the transferred charge may be as high as a thousand degrees above the exhaust temperature. In this invention the chamber 40 is made relatively small which cuts down the hot wall surface capable of absorbing heat and there are also no pockets of dead gases to interfere with the transfer of heat energy. Though not limited to any particular type of starting ignition the location of the spark plug within this chamber 40 so that the rapid passage of hot gases from one cylinder into a second succeeding cylinder is past this plug, helps keep it clean. Timing of this spark plug is controlled in the usual manner by an adjustable timer.

A further advantage of this invention is the location of the heat energy transfer ports 39 in that portion of the tapered valve, which, when considered in relation with the supply and exhaust ports 35 and 38 respectively, results in over-coming local heating and in maintaining the taper constant, so that uniform wear results and the angle of the taper doesn't change. The relative location of the heat energy transfer ports 39 with respect to the supply and exhaust ports will be seen, and it will also be seen that the ports 39 are longitudinally nearer the supply end than the exhaust end and transversely nearer the supply than the exhaust ports as shown in Fig. 6; with the result that only a portion of the exhaust gases are responsible for the expansion at the small end of the tapered valve, while the heat losses from the transfer ports 39 and chamber 40 are largely responsible for the expansion of the valve at the large end.

Another feature of this invention is the simplicity of construction of the cushioning means used for taking up thrust on the tapered valve necessitating relatively few parts.

Yet a further benefit of this invention resides in the provision of means for equalizing the pressure and wear on the yokes. The location of the main exhaust ports on the lagging side of the inclined cylinders insures a relatively dry exhaust, and enables the centrifugal separation of enough lubricating oil from the leading side of the cylinder to lubricate the piston. The cylinder and pistons of this invention are considerably larger in proportion to the size of the valve used, with the result that greater power is attained from an engine of a given size and the path traversed by hot gases going from the working cylinder into the second succeeding cylinder is thus shortened.

As shown in Fig. 14 the water outlet passageway through the shaft extension is helical, so that the water is moved out from the rotor casting, and all the cooling water may be drained through this passageway, leaving none in the rotor. This is because the cooling water in each cylinder jacket moves inwardly during the time that the cylinder is above the shaft and when the water moves inwardly it contacts with the helical outlet passage and is moved out of the packet through this passage as said helical passage rotates.

The pulley shown at the right in Fig. 1 is mounted on a shaft rotating with the cylinders. Adjacent to pulley 69 at the left of Fig. 1 is shown a governor which controls the supply of fuel charge to the engine. The ignition circuit supply wire is attached to the contact terminal 46, while the other is grounded.

The provision of means to safeguard the automatic valve unseating means by providing against the valve becoming accidentally jammed on its seat in case the engine rotates in the wrong direction is another advantageous feature of this invention. The use of oppositely arranged skew gears substantially balances thrusts of the transmission gears. With the particular skew gear arrangement illustrated for automatically unseating the valve, with increase in the driving torque rotation in the opposite direction will not result in the valve being jammed on its seat.

Another advantage of this invention resides in having the major portion of the exhaust pass out the side of the cylinder where it by passes and does not unduly heat the valve as only a small portion of the exhaust passes through the supply ports into the valve. As illustrated where the main exhaust passageway joins the exhaust from the valve, the junction is shaped so that the main exhaust functions to siphon or suck the exhaust passing through the valve and thus assist in scavenging the burned gases from the cylinders.

Internal supercharging by adding enough heat energy to a succeeding cylinder taken from a working cylinder during an early portion of the power stroke, raises the temperature and mean effective pressure in the cylinder receiving the heat, and this increase in temperature and pressure increases the thermal efficiency of the engine.

That there is an increase of mean effective pressure is evidenced by the fact that after the engine is started it continuously accelerates to such high speed as to require slowing down by shifting the valve. The exhaust gas is unusually cool. The best theory which can be given for this unexpected and novel action is that the direct admission of a given quantity of heat energy in the high temperature, high pressure gas in a minimum of time and through a passage of minimum length effects an extremely rapid detonating action in the compressed charge rather than mere ignition. That detonation is availed of is evident by the large angle of firing advance possible, which is wholly useless in an ordinary upright engine. It is also believed that a given amount of heat energy such as that passed from one cylinder to another is more effective in producing kinetic energy than it would be if kept in the cylinder and largely lost in expansion and absorption in the cylinder walls. By reason of such continuous heat energy transfer the action is considered to be regenerative. Detonating a charge and permitting the instantaneous high resulting pressure to produce rotation without absorption in bearings, as is permitted here by the tangential cylinders, results in the production of a very efficient prime mover.

The engine of the type illustrated is also adapted for additional supercharging by the application of increased pressure to the supply charge fed into the cylinders. While external or supercharging in this last mentioned manner is not satisfactory in many engines on account of the loss in energy from stopping and starting columns of gas or changing their direction, such is especially adapted for an engine of the type illustrated because the supply fluid is fed continuously into the engine without changing its direction, some one or more intake ports being always open and the direction of the fuel charge is always the same and whirling as it travels through the valve sleeve within the shaft. It will thus be seen that the engine of this invention is particularly adapted for large loads, considering its size, by reason of its being applicable to two kinds of supercharging, namely, external supercharging or that due to increase in pressure of the supply fluid and also internal supercharging resulting from the addition of heat energy taken from previously fired cylinder.

As used in the claims the term ignition is used to signify completion of burning and the attainment of substantially the maximum pressure.

Since the valve is cooler and the heat transfer passage hotter in this invention than in previous constructions, it follows that the passage is heat insulated. The jacket or gas space around this passage partially insulates it even though some heat be absorbed by the incoming fuel charge. Too complete a heat insulator would not be practicable for this passage.

This invention is a continuation in part of my prior applications S. N. 427,475, filed Dec. 1, 1920 for rotary reciprocating combustion engine; S. N. 485,499, filed July 18, 1921 for combustion engine; S. N. 658,035, filed Aug. 18, 1923 for internal combustion engine.

I claim:

1. A multiple rotatable cylinder combustion engine provided with means concentric with the cylinder rotation and between the cylinders for successively increasing the mean effective pressures in succeeding cylinders from preceding working cylinders with a given rate of fuel supply, said means including a tapered valve, and mechanism for longitudinally shifting the valve on increase in its driving torque.

2. A combustion engine comprising rotatable cylinders, driven means for transferring successively increasing amounts of heat from a working to a succeeding cylinder with a given fuel supply and means for changing the timing of transferring said heat during rotation.

3. In a combustion engine having rotatable cylinders each provided with a gas port and combustion space at the inner end, supporting means for said cylinders, pistons in the cylinders, driving connections for the pistons, means engaging said driving conections for actuating the pistons, the combination with a valve concentric with the cylinder rotation for controlling the cylinder ports, means for driving the valve in timed relation to the cylinders, means comprising a chamber within said valve heat insulated from the valve body for transferring a portion of the ignited charge from a working to a succeeding cylinder before ignition therein.

4. In a combustion engine having rotatable cylinders each provided with a gas port and combustion space at the inner end, pistons in the cylinders, driving connections for the pistons, means engaging said driving connections for actuating the pistons, the combination with a valve concentric with the cylinder rotation for controlling the cylinder ports, means for driving the valve in timed relation to the cylinders, means for transferring a portion of the ignited charge from a working cylinder to a succeeding cylinder before ignition therein, comprising a chamber within said valve jacketed from the valve body, ports in the valve surface connected with said chamber, and an expansion joint in the connection between the valve body and said chamber.

5. In a combustion engine, a rotor including diverging cylinders each having a gas port and combustion space at the inner end, a piston in each cylinder, means for reciprocating the pistons during the cylinder rotation, a tapered rotary valve concentric with the cylinder movement for controlling the passage of hot gas from said cylinders, a tapered seat for said valve, means for pressing the valve on its seat, means for driving the valve in timed relation to the cylinders, transversely connected heat insulated cross firing passages in said valve constructed to connect non-adjacent cylinders to successively increase the mean effective pressure in succeeding cylinders.

6. In a combustion engine, a rotor including diverging cylinders each having a gas port and combustion space at the inner end, a piston in each cylinder, means for reciprocating the pistons during the cylinder rotation, a tapered rotary valve concentric with the cylinder movement for controlling the passage of hot gas from said cylinders, a tapered seat for said valve, means for pressing the valve on its seat, means for driving the valve in timed relation to the cylinders, transversely connected heat insulated cross firing passages in said valve constructed to connect non-adjacent cylinders to successively increase the mean effective pressure in succeeding cylinders, the ends of said passages being so shaped and positioned as to substantially disconnect a working cylinder before being connected with a succeeding cylinder.

7. A combustion engine comprising a plurality of cylinders, a tapered valve symmetrically disposed between the cylinders and controlling the passage of hot gas from said cylinders, having a passage through the valve adjacent one end of its tapered portion for transferring incandescent gas at high pressure from one cylinder to another, and means for controlling heating of the remander of the tapered portion of said valve to maintain the taper substantially constant.

8. In a combustion engine, rotatable cylinders, pistons in each cylinder, driving connections for the pistons, a tapered valve concentric with the cylinder movement controlling a portion of the exhaust, transverse cross firing passages through the tapered portion of the valve, and means for passing enough exhaust around said valve to maintain its taper substantially constant.

9. In a combustion engine, a rotor including diverging cylinders each having a gas port and combustion space at the inner end, pistons for the cylinders, driving connections for the pistons, a rotatable tapered valve concentric with the cylinder movement, supply, exhaust and cross firing passages through said valve, said cross firing passages being located longitudinally nearer the supply than the exhaust passages, and means for passing sufficient exhaust from the engine around said valve to maintain its taper substantially constant.

10. A combustion engine comprising a cylinder, piston controlled means for effecting initial high temperature exhaust and a driven tapered valve for effecting final low temperature exhaust whereby the temperature of said valve is so distributed as to maintain its taper substantially constant.

11. A combustion engine comprising a cylinder, a piston therein, driving connections for the piston, a tapered valve controlling the removal of hot gas from the cylinder, a tapered valve seat, means for holding the valve on its seat, means for longitudinally shifting the valve against said holding means on increase in its driving torque, and means to prevent jamming the valve on its seat on rotation in the reverse direction.

12. In a combustion engine having rotatable cylinders each provided with a gas port and combustion space adjacent the inner end, supporting means for the cylinders, pistons in the cylinders, driving connections for the pistons, means engaging said driving connections for actuating the pistons, the combination with the tapered valve concentric with the cylinder movement for controlling removal of hot gas from the cylinders, means for rotating the valve in timed relation to the cylinders, a valve seat, means for holding the valve on its seat, means for longitudinally shifting the valve against said holding means with increase in its driving torque and means to prevent jamming the valve on its seat on rotation in the opposite direction.

13. A fluid pressure engine comprising a cylinder, a piston therein, driving connections for the piston, a tapered valve therefor controlling the passage of hot fluid therethrough, means for longitudinally shifting said valve on increase in its driving torque, and means to render said shifting means inoperative on reversal of said engine.

14. A combustion engine comprising a cylinder, a piston therein, driving connections for the piston, a tapered valve controlling the removal of hot gas from the cylinder, a tapered valve seat, means for holding the valve on its seat, means for longitudinally shifting the valve against said holding means on increase in its driving torque, means to prevent jamming the valve on its seat on rotation in the reverse direction, and means for adjusting the timing of said valve during rotation.

15. In a combustion chamber, a rotor including diverging cylinders each having a gas port and combustion space at the inner end, a piston in each cylinder, driving connections for the pistons, a tapered valve between said cylinders and concentric with their movement, means for driving the valve in timed relation to the cylinders, a tapered seat for the valve, yieldable means for holding the valve on its seat, means for longitudinally shifting the valve against said holding means on increase in its driving torque, means for longitudinally holding said valve against excessive shifting toward its seat on rotation in the opposite direction.

16. In a combustion engine, a rotor including diverging cylinders each having a gas port and combustion space at the inner end, a piston in each cylinder, means for reciprocating the pistons during cylinder rotation, a tapered valve concentric with the cylinder movement, passages through said valve for transferring a portion of an ignited charge from a working to a succeeding cylinder, a tapered seat for said valve, fluid pressure means for holding the valve on its seat, means for supplying an oil film between the valve and its seat, means for longitudinally shifting the valve against said holding means on increase in its driving torque, and means for holding said valve against jamming on its seat on rotation in the opposite direction.

17. In a combustion engine, a rotor including diverging cylinders each having a gas port and combustion space at the inner end, a piston in each cylinder, means for reciprocating the pistons during cylinder rotation, a rotary tapered valve concentric with the cylinder movement for controlling the admission of gas to the cylinders, a seat for the valve, means for pressing the valve on its seat, means for driving the valve in timed relation to the cylinders, skew gear means for longitudinally shifting the valve on expansion against said pressing means, means for locking said shifting means against jamming the valve on its seat upon rotation in a reversed direction and means controlling the exhaust from said cylinders.

18. A combustion engine comprising rotatable cylinders tangent to a circle concentric with their movement, a casing around said cylinders, exhaust means on one side of said cylinders, and means on another side of said cylinders where subjected to greater centrifugal force for passing oil intermittently from said cylinders to said casing.

19. A combustion engine comprising diverging rotatable cylinders, a valve between said cylinders, means for driving the valve in timed relation to the cylinders, an exhaust passage through the valve, another exhaust passage from each cylinder around the valve, said exhaust passages being joined and their junction shaped to permit the exhaust passages around the valve to syphon gas through the exhaust passage in the valve.

20. In a combustion engine having diverging rotatable cylinders arranged tangent to a circle concentric with the cylinder movement, and each provided with a gas port and combustion space at their inner ends, pistons in the cylinders, driving connections for the pistons, means engaging said driving connections for actuating the pistons, the combination with a valve concentric with the cylinder movement for controlling the passage of cylinder fluid, of means for driving the valve in timed relation to the cylinders, exhaust ports on the lagging side of said cylinders, and means on the leading side of said cylinders for removing oil centrifugally separated therein.

21. In a rotatable diverging cylinder combustion engine having a gas port and combustion space at the inner end of each cylinder, pistons in the cylinders, driving connections for the pistons, means engaging the driving connections for actuating the pistons, the combination with a valve concentric with the cylinder movement for controlling the cylinder fluid, means for actuating said valve in timed relation to the cylinders, exhaust ports on the lagging side of said cylinders, passages from said ports, means in said passages for opening said passage every other stroke of the piston, a seat for said valve, and liquid pressure means for holding said valve on its seat.

22. In a combustion engine having diverging rotatable cylinders each provided with a gas port and combustion space at the inner end, pistons in the cylinders, driving connections for the pistons, means connecting said driving means for actuating said pistons, the combination with a tapered valve concentric with the cylinder movement for controlling the removal of hot gas from the cylinders, means for driving the valve in timed relation to the cylinders, a valve seat, a fluid pressure diaphragm for balancing thrusts of cylinder pressure in the tapered portion of said valve, and means for longitudinally shifting said valve with increase in its driving torque against said diaphragm.

23. A combustion engine having rotatable diverging cylinders each provided with a gas port and combustion space at the inner end, pistons in the cylinders, driving connections for the pistons, means engaging said driving connections for actuating the pistons, the combination with a valve concentric with the cylinder movement for controlling the passage of cylinder fluid, means for driving the valve in timed relation to the cylinders, said driving connections for the pistons comprising means on each side of each cylinder to transmit piston pressure to the engaging connections for actuating the pistons, and means including a universal joint for equalizing the pressure on said piston pressure transmission means on each side of the cylinders.

24. In a combustion engine having diverging rotatable cylinders each provided with a gas port and combustion space adjacent the inner end, pistons in the cylinders, driving connections for the pistons, means engaging said driving connections for actuating the pistons, the combination with a valve concentric with the cylinder movement for controlling the passage of cylinder fluid, of means for circulating cooling fluid around said cylinders, and helical means for extracting all of the cooling fluid from around said cylinders on rotation thereof.

25. In a combustion engine having diverging rotatable cylinders each provided with a gas port and combustion space at the inner end, pistons in the cylinders, driving connections for the pistons, means engaging said driving connections for actuating the pistons, the combination with a valve concentric with the cylinder movement for controlling the passage of cylinder fluid, means for driving the valve in timed relation to the cylinders, means on the leading side of each cylinder for passing oil around the pistons, said last mentioned means including a closed passage in the cylinder walls each of whose ends lead into the cylinder through ports spaced far enough apart to be uncovered separately above and below by the piston on each side of said piston and shaft to enable centrifugal force to pass oil through said passage.

26. In a combustion engine, a rotor including diverging cylinders each having a gas port and combustion space at the inner end, a piston in each cylinder, means for reciprocating the pistons during cylinder rotation, a rotary tapered valve concentric with the cylinder movement for controlling the admission of gas to the cylinders, a seat for the valve, means for pressing the valve on its seat, means for driving the valve in timed relation to the cylinders including means for longitudinally shifting the valve against said pressing means upon increase of driving torque, means for locking said shifting means against jamming the valve on its seat upon rotation in a reverse direction, means controlling the exhaust from said cylinders, and means for varying the timing of said valve while the engine is running.

27. A fluid pressure engine having a cylinder, a piston therein, driving connections for the piston, a tapered valve controlling the passage of hot fluid, a tapered valve seat, liquid pressure means for holding said valve on its seat, means for driving said valve in timed relation to said piston, and means for longitudinally shifting said valve against said holding means on increase in its driving torque.

28. In a combustion engine having diverging rotatable cylinders, each provided with a gas port and combustion space at the inner end, pistons in said cylinders, driving connections for the pistons, the combination with a rotary valve concentric with the cylinder movement for controlling admission of gas to said cylinders, of means for driving the valve in timed relation to said cylinders, driving connections for the pistons comprising means on each side of said cylinder to transmit piston pressure to said eccentric actuating means, and universal joints for equalizing the piston pressure on each side of the cylinders.

29. In a combustion engine, rotatable diverging cylinders, each provided with a gas port and combustion space at the inner end, pistons in said cylinders, driving connections for the pistons, the combination with a rotatable valve concentric to the cylinder movement for controlling the supply of driving fluid through the cylinder ports, of driven means for actuating the valve, and means on a side of each cylinder for passing oil around the piston, said last mentioned means comprising a passage each of whose ends lead into the cylinder to be uncovered separately by the piston to enable centrifugal force to pass oil around the piston.

30. In a combustion engine, a rotor including diverging cylinders each having a gas port and combustion space at the inner end, a piston in each cylinder, means for reciprocating the pistons during the cylinder rotation, a tapered rotary valve concentric with the cylinder movement for controlling the passage of hot gas from said cylinders, a tapered seat for said valve, means for pressing the valve on its seat, means for driving the valve in timed relation to the cylinders, separate jackets around each cylinder and connected at the inner portion, means for supplying liquid to said jackets, helical means concentric with the valve for draining said jackets.

31. In a combustion engine, a rotor including diverging cylinders each having a gas port and combustion space at the inner end, a piston in each cylinder, means for reciprocating the pistons during cylinder rotation, a tapered valve concentric with the cylinder movement for controlling the passage of hot gas from said cylinders, a tapered seat for said valve, means for yieldably holding the valve on its seat, means for successively increasing the mean effective pressures in said cylinders by transferring a portion of incandescent gas from a working cylinder at a high temperature and pressure into a succeeding cylinder, and means for longitudinally shifting said valve against said holding means on increase in its driving torque.

32. In a combustion engine, a rotor including diverging cylinders each having a gas port and combustion space at the inner end, a piston in each cylinder, means for reciprocating the pistons during cylinder rotation, a valve concentric with the cylinder movement, and provided with passages for extracting portions of incandescent gas from a working cylinder at high temperature and pressure, a jacketed heat reservoir within said valve internally connected with said passages, means for discharging heat from said reservoir directly into a succeeding cylinder at a sufficient temperature and pressure to increase the mean effective pressure.

33. In a combustion engine, a rotor including diverging cylinders each having a gas port and combustion space at the inner end, a piston in each cylinder, means for reciprocating the pistons during cylinder rotation, a valve concentric with the cylinder movement controlling the passage of hot gas from said cylinders, a heat reservoir in said valve, nozzles in said valve successively connecting said reservoir directly with the cylinders, at least one of said nozzles being substantially continuously in use, means for rotating said valve in timed relation to the cylinders, and means for passing a portion of an ignited charge from a working cylinder at high temperature and pressure into a succeeding cylinder through said nozzles and reservoir to increase its mean effective pressure.

34. In a multi cylinder combustion engine, a cylinder, a piston therein, driving connections for the piston, a movable tapered valve body having ports and a longitudinal passage for controlling a portion of the exhaust from said cylinders and having transverse cross ignition incandescent gas transfer ports, said exhaust and transfer ports being so located longitudinally of the taper valve body as to maintain the taper substantially constant when the valve is heated.

35. In a multi cylinder combustion engine, a cylinder, a piston therein, driving connections for the piston, a movable tapered valve body having ports and a longitudinal passage for controlling a portion of the exhaust from said cylinders and having transverse cross ignition incandescent gas transfer ports, said transfer ports being located toward the opposite end of the valve body from the longitudinal exhaust passage.

Signed at New York in the county of New York and State of New York this 2nd day of July A. D. 1925

WILLIAM HARPER, Jr.

CERTIFICATE OF CORRECTION.

Patent No. 1,722,260.  Granted July 30, 1929, to

WILLIAM HARPER, JR.

It is hereby certified that error appears in the printed specification of the above numbered patent requiring correction as follows: Page 1, lines 4 and 5, for the word "regeneration" read "regenerative", and line 43, strike out the words "the desired speed timing of the" and insert instead "of the cylinders. The concentric"; page 4, line 4, for the word "passages" read "passage", and line 65, before the word "transfer" insert the word "energy"; page 6, line 28, claim 3, for the misspelled word "conections" read "connections", and line 99, claim 7, for "remander" read "remainder"; and that the said Letters Patent should be read with these corrections therein that the same may conform to the record of the case in the Patent Office.

Signed and sealed this 1st day of October, A. D. 1929.

(Seal)

M. J. Moore,
Acting Commissioner of Patents.